Patented Nov. 25, 1924.

1,516,588

UNITED STATES PATENT OFFICE.

DONALD B. BRADNER, OF EDGEWOOD, MARYLAND.

PROCESS OF MAKING OXIDES OF NITROGEN AND CAUSTIC ALKALI.

No Drawing. Application filed August 10, 1921. Serial No. 491,267.

*To all whom it may concern:*

Be it known that I, DONALD B. BRADNER, a citizen of the United States, residing at Edgewood, Maryland, in the county of Harford and State of Maryland, have invented certain new and useful Improvements in the Process of Making Oxides of Nitrogen and Caustic Alkali, of which the following is a specification.

This invention relates to a process of making nitric acid and caustic alkali.

Among the objects of this invention is to provide a process for making $HNO_3$ and caustic alkali wherein all of the materials involved in the reactions either enter into the final desired products of else are recovered for subsequent use in the process. A further object of this invention is to provide a method of efficiently removing the volatile products given off in the reaction, thereby adding to the efficiency of the process.

When a mixture of sodium nitrate and ferric oxide are heated at temperatures from 400 to 900° C., the following reaction takes place:

$$2NaNO_3 + Fe_2O_3 \rightleftarrows Na_2Fe_2O_4 + 2NO_2 + O.$$

This reaction is reversible and it is therefore essential to provide those necessary conditions which make the reaction proceed in the direction desired, in order that satisfactory efficiency may be obtained.

I have found that in order to obtain complete decomposition of the nitrate, it is necessary to remove the gaseous products of the reaction from the reacting mass, and preferably, very soon after the gaseous products are generated.

More specifically, my process consists in conducting a mixture of finely comminuted sodium nitrate and ferric oxide thru a mechanical furnace, provided with suitable mechanism therein to cause the materials to be agitated and brought in intimate contact with each other. The materials in the furnace are heated to a temperature of 400 to 900° C., and the gaseous products evolved in the reaction are continuously swept from the sphere of the reaction and out of the furnace by means of a current of air passing thru the furnace and over the reacting materials in a direction counter to that of the latter. Instead of air, I may use a mixture of air or steam or the products of combustion of fuel with air or air containing gas which is substantially inert to the oxides of nitrogen evolved in the reaction.

It will be seen that this process permits of internal or direct heating of the reacting mass when fuel gases are passed over the mass, and this results in a very great economy of fuel. The furnace used for the reaction should be of material which will resist the action of the reacting mass and the evolved gases, and I have found that a furnace constructed of "nichrome," an alloy of nickel and chromium, is highly suitable for this purpose.

The gaseous products which are swept from the furnace are passed thru a suitable absorbent or adsorbent such as silica gel, sulfuric acid, etc., which takes out the nitrogen peroxide, and the latter may be recovered by distillation as liquid nitrogen peroxide or otherwise.

If nitric acid, instead of nitrogen peroxide, is desired as the end product, the gases from the furnace are absorbed in water in the usual manner, e. g. by passing thru acid absorption towers in which the nitrous gas-air mixture flows in one direction and the dilute nitric acid in the opposite direction. If steam is used instead of air, the reaction in the furnace will take place at a somewhat lower temperature. The reaction resulting in the formation of nitric acid is as follows:

$$2NO_2 + H_2O + O \rightarrow 2HNO_3$$

The spent material in the furnace, which is substantially all sodium ferrite and ferric oxide (since originally an excess of ferric oxide is used), is removed from the furnace and by treating with water, the ferric oxide is regenerated and caustic soda is formed according to the following equation:

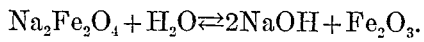

$$Na_2Fe_2O_4 + H_2O \rightleftarrows 2NaOH + Fe_2O_3.$$

The regenerated ferric oxide is thus available for re-use in the process. The sodium ferrite reacts slowly (3 to 4 hours) with the water and it is advantageous to have the water at 80–100° C.

In practicing this process I use a mechanical furnace and this may be of the rotary type or the multiple hearth type, and the process is conducted so that the reacting mass is gradually and substantially continuously fed to and thru the furnace and the spent mass of sodium ferrite continuously removed. The process is therefore capable of being conducted with substantially no interruption, and this applies whether the agitation is continuous or intermittent and in this respect possesses a very great advantage over the prior processes of forming nitrogen peroxide and nitric acid.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of making oxides of nitrogen and caustic alkali, heating by means of combustion gases within a furnace a charge of a nitrate of an alkali metal and ferric oxide disposed therein, said combustion gases providing sufficient heat for said entire heating, agitating the charge and maintaining same in substantially continuous movement from the intake to the outlet of the furnace and removing the evolved oxides of nitrogen by said combustion gases moving in a direction opposite to that of the charge.

2. In a process of making oxides of nitrogen and caustic alkali, heating by means of combustion gases within a furnace a charge of a nitrate of an alkali metal and ferric oxide disposed therein, said combustion gases providing sufficient heat for said entire heating, agitating the charge, progressively moving same from the intake to the outlet of the furnace and sweeping the evolved gases from the charge by means of said combustion gases passing over and moving counter to the charge.

3. In a process of making oxides of nitrogen and caustic alkali, heating by means of combustion gases within a furnace a charge of a nitrate of an alkali metal and ferric oxide disposed therein, said combustion gases providing sufficient heat for said entire heating, agitating the charge and maintaining same in substantially continuous movement from the intake to the outlet of the furnace and sweeping the evolved gases from the charge by means of said combustion gases passing over and moving counter to the charge.

4. A process comprising heating by means of combustion gases within a furnace a charge of an alkali metal nitrate and ferric oxide disposed therein, said combustion gases providing sufficient heat for said entire heating, agitating the charge and maintaining same in substantially continuous movement from the intake to the outlet of the furnace, removing the evolved oxides of nitrogen by said combustion gases moving in a direction opposite to that of the charge and then removing the oxides of nitrogen from the gas by an adsorbing agent.

5. A process comprising heating by means of combustion gases within a furnace a charge of an alkali metal nitrate and ferric oxide disposed therein, said combustion gases providing sufficient heat for said entire heating, agitating the charge and progressively moving same from the intake to the outlet of the furnace, sweeping the evolved gases from the charge by means of said combustion gases passing over and moving counter to the charge and removing the oxides of nitrogen from the evolved gases by an adsorbing agent.

DONALD B. BRADNER.